United States Patent
Hentges et al.

(10) Patent No.: US 11,001,781 B1
(45) Date of Patent: May 11, 2021

(54) PROCESS AND SYSTEM FOR ENHANCING RECOVERY OF ESSENTIAL OIL

(71) Applicant: Tropicana Products, Inc., Bradenton, FL (US)

(72) Inventors: Kelly Hentges, Cedar Rapids, IA (US); Johnny Casasnovas, Barrington, IL (US); Gerald Olean Fountain, Wilmette, IL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 16/669,073

(22) Filed: Oct. 30, 2019

(51) Int. Cl.
*C11B 1/10* (2006.01)
*C11B 1/04* (2006.01)
*B01D 11/02* (2006.01)
*B04B 1/08* (2006.01)
*B01D 17/02* (2006.01)

(52) U.S. Cl.
CPC ............ *C11B 1/10* (2013.01); *B01D 11/0211* (2013.01); *C11B 1/04* (2013.01); *B01D 11/028* (2013.01); *B01D 17/0217* (2013.01); *B04B 1/08* (2013.01)

(58) Field of Classification Search
CPC ... C11B 1/04; C11B 1/10; C11B 9/025; A23L 3/32; B01D 11/0211; B01D 11/028; B01D 17/0217; A23N 1/00
See application file for complete search history.

(56) References Cited

U.S. PATENT DOCUMENTS

| | | | | |
|---|---|---|---|---|
| 4,070,959 | A * | 1/1978 | Bushman | A23N 1/003 241/277 |
| 4,470,344 | A * | 9/1984 | Bushman | A23N 1/003 99/509 |
| 9,029,108 | B2 * | 5/2015 | Kempkes | C11B 1/10 435/173.1 |
| 2004/0166019 | A1* | 8/2004 | Schultheiss | C13B 10/08 422/22 |
| 2007/0202601 | A1 | 8/2007 | Swoboda | |
| 2011/0038992 | A1 | 2/2011 | Arnold et al. | |

(Continued)

FOREIGN PATENT DOCUMENTS

| | | |
|---|---|---|
| CN | 104017643 | 9/2014 |
| CN | 105713730 | 6/2016 |

OTHER PUBLICATIONS

Chemat, F. et al., Solvent-free extraction of food and natural products, 2015, Trends in Analytical Chemistry, vol. 71, pp. 157-168 (Year: 2015).*

(Continued)

*Primary Examiner* — Yate' K Cutliff
(74) *Attorney, Agent, or Firm* — Barnes & Thornburg LLP; G. Peter Nichols

(57) ABSTRACT

A process and system to extract essential oil from an essential oil-containing food material is described. The process includes subjecting the essential oil-containing food material to a pulsed electric field; extracting the essential oil into water to form a first fluid mixture that contains essential oil, an essential oil-water emulsion, and water; and separating the first fluid mixture into a waste mixture and a second fluid mixture, where the concentration of essential oil in the second fluid mixture is greater than the concentration of essential oil in the first fluid mixture.

12 Claims, 4 Drawing Sheets

(56) References Cited

U.S. PATENT DOCUMENTS

2018/0020714 A1* 1/2018 Waters ............... A23N 1/02
99/496
2019/0116854 A1 4/2019 Bhaskar et al.

OTHER PUBLICATIONS

Guderjan, M. et al., Impact of pulsed electric field treatment on the recovery and quality of plant oils, 2005, Journal of Food Engineering vol. 67, pp. 281-287 (Year: 2005).*

Guderjan, M. et al., Application of pulsed electric fields at oil yield and content of functional food ingredients at the production of rapseed oil, 2007, Innovative Food Science and Emerging Technologies, vol. 8, pp. 55-62 (Year: 2007).*

Pourzaki, et al., "Pulsed Electric Field Generators in Food Processing," 18th National Congress on Food Technology, 1-7 (2008).

Puertolas, et al., "Pulsed Electric Field: Groundbreaking Technology for Improving Olive Oil Extraction," at https://www.aocs.org/stay-informed/inform-magazine/featured-articles/pulsed-electric-field-groundbreaking-technology-for-improving-olive-oil-extraction-march-2016 (2016).

Buckow, et al., "Pulsed Electric Field Processing of Orange Juice: A Review on Microbial, Enzymatic, Nutritional, and Sensory Quality and Stability," Comprehensive Reviews in Food Science and Food Safety, 12 455-467 (2013).

Mohamed et al., "Pulsed Electric Fields for Food Processing Technology," IntechOpen, 11 275-306 (2012).

Kesterson et al., "Brown Oil Extractor, A New Commercial Method for the Production of Citrus Essential Oils in Florida," Allured Publishing Corp., 4 9-10 (1979).

Modular Oil Recovery Extractor, JBT MORE (2017).

Citrus Peel Oil Recovery Systems Operations Manual, JBT (2018).

Citrus Extractor, JBT (2017).

Kademi et al., "Citrus Peel Essential Oils: A Review on Composition and Antimicrobial Activities," International Journal of Food Safety, Nutrition, Public Health and Technology, 9, 5 38-44 (2017).

International Search Report and Written Opinion dated Nov. 18, 2020 in PCT/US2020/048206.

Zhou et al., "Effects of High Intensity Pulsed Electric Fields on Yield and Chemical Composition of Rose Essential Oil Citation," International Journal of Agricultural and Biological Engineering, vol. 10, No. 3, pp. 295-301 (2017).

Miloudi et al., "Intensification of Essential Oil Extraction of Artemisia Herba Alba Using Pulsed Electric Field," 2018 International Conference on Electrical Sciences and Technologies in Maghreb (Cistern), IEEE, pp. 1-5 (2018).

Farid et al., "Solvent-Free Extraction of Food and Natural Products," Trac Trends in Analytical Chemistry, vol. 71, pp. 157-168 (2015).

Peiro et al., "Improving Polyphenol Extraction from Lemon Residues by Pulsed Electric Fields," Waste and Biomass Valorization, vol. 10, No. 4, pp. 889-897 (2017).

* cited by examiner

PROCESS AND SYSTEM FOR ENHANCING RECOVERY OF ESSENTIAL OIL

The present disclosure relates to processes and systems for enhancing the recovery of essential oil from plants and in some instances for enhancing the recovery of essential oil from fruits such as citrus fruits.

BACKGROUND

Essential oil (also referred to as essential oils) is found in plants, algae, and animal matter and is extracted for use in food manufacturing, pharmaceuticals, animal feeds, cosmetics, spices, chemicals and other uses. The essential oil in citrus fruits is typically found in the outer peel or flavedo and is often a by-product of citrus juice production such as orange juice production. That being said, essential oil is a valuable product that may be further refined into many different compounds or, in some instances depending on the processing may be sold as cold-pressed essential oil. Accordingly, there is a need for a method to enhance the recovery of desired essential oil.

SUMMARY

According to one aspect of the disclosure, a system for enhancing the recovery of essential oil is described. The system includes a pulsed electric field (PEF) apparatus configured to deliver a pulsed electric field to an essential oil-containing food material as it passes through the pulsed electric field apparatus. Downstream of the PEF apparatus, an extractor is provided to extract the essential oil from the food material into water to form a first fluid mixture containing an emulsion of essential oil (an essential oil-water emulsion). One or more separators are provided downstream of the extractor to separate the essential oil from the first fluid mixture to form a second fluid mixture containing a higher concentration of essential oil than the concentration of essential oil in the first fluid mixture. Optionally, one or more additional separators may be provided to separate the essential oil from the second fluid mixture to form a third fluid mixture containing a higher concentration of essential oil than the concentration of essential oil in the second fluid mixture. This third fluid mixture may be considered to be a finished product suitable for packaging. In one embodiment, the system may also include equipment to reduce the temperature of the third fluid mixture. In another embodiment, one or more separators may be provided downstream from the third fluid mixture to separate the essential oil from the third fluid mixture to form a fourth fluid mixture having a concentration of essential oil greater than the concentration of essential oil in the third fluid mixture.

According to another aspect, a method or process for enhancing the recovery of essential oil is disclosed. The process includes subjecting an essential oil-containing food material to a pulsed electric field, extracting the essential oil from the food material into water to define a first fluid mixture containing an emulsion of essential oil. The first fluid mixture may also include solids, proteins, and other constituents of the food material source (e.g., plant material).

The essential oil-containing food material source may be any plant, algae, and/or animal matter that contains essential oil. However, it is to be understood that the described process applies to the enhanced recovery of essential oil from any essential oil-containing material. In some aspects, the essential oil-containing food material is a plant that may be edible such as a fruit or vegetable. In certain aspects, the fruit may include, but is not limited to, fruits in the Rutaceae family as exemplified by orange, lemon, grapefruit, pomelo, lime, mandarin, clementine, which may be referred to as citrus fruits. In some embodiments, the essential oil is obtained from the peel or flavedo of citrus fruits.

The process also includes separating the first fluid mixture to produce a second fluid mixture that includes a mixture of essential oil, an essential oil-water emulsion, and water. The first fluid mixture contains a first concentration of essential oil, and the second fluid mixture includes a second concentration of essential oil that is greater than the first concentration of essential oil. The process may also comprise separating the second fluid mixture to produce a third fluid mixture. The third fluid mixture includes a third concentration of essential oil that is greater than the second concentration of essential oil.

In some embodiments, the process may include changing (either reducing or increasing) the temperature of any of the first fluid mixture, the second fluid mixture, the third fluid mixture or any combination of the mixtures. In some embodiments, the third fluid mixture may contain from about 91% to about 97% (wt./wt.) of essential oil and may be suitable as a finished product (i.e., may be packaged for use).

In one embodiment, the third fluid mixture is sent to a third separator to produce a fourth fluid mixture that contains a fourth concentration of essential oil that is greater than the concentration of essential oil in the third fluid mixture. The fourth fluid mixture contains about 91% to about 97% (wt./wt.) essential oil, which may be considered substantially pure essential oil. It is contemplated that the third fluid mixture may also be considered substantially pure essential oil.

In one embodiment, the substantially pure essential oil may exhibit a specific gravity of about 0.83 to about 0.86 or about 0.0835 to about 0.85, or about 0.845 at 25° C.

Unless otherwise explicitly noted, all percentages in the disclosure refer to a percent by weight.

BRIEF DESCRIPTION OF THE DRAWINGS

The following description accompanies the drawings, all given by way of non-limiting examples that will be useful to understand how the described process and system may be embodied.

DESCRIPTION

Figure 1:
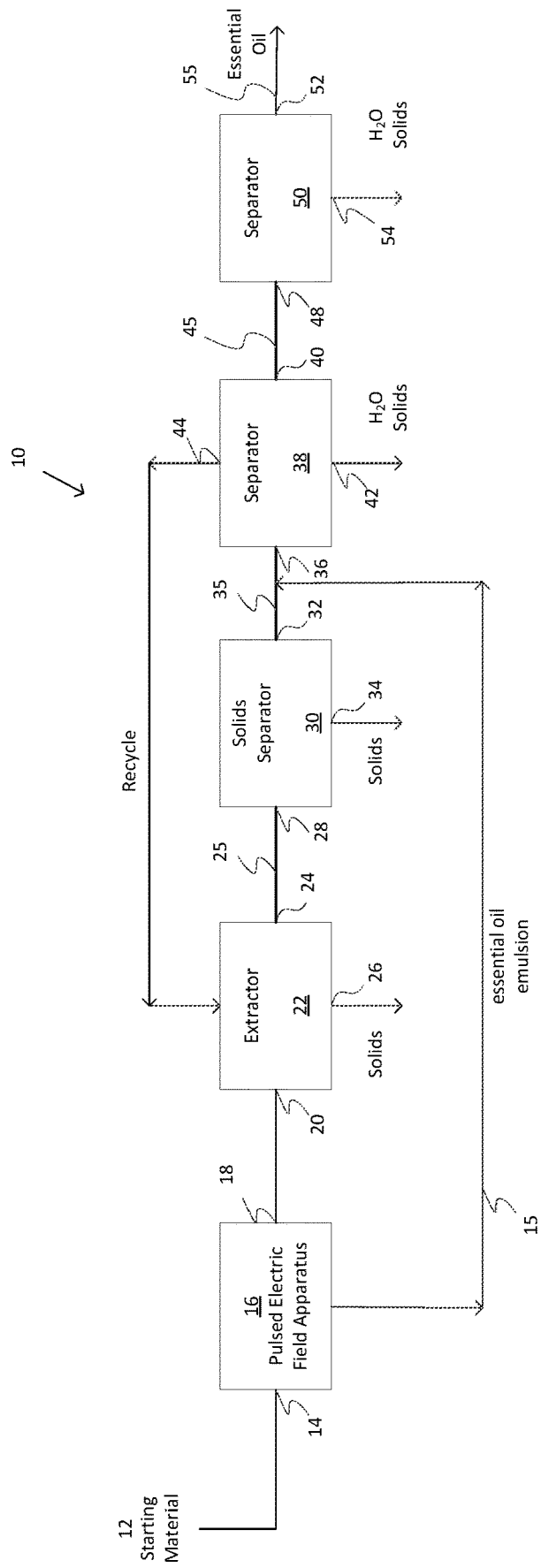
FIG. 1 is a simplified schematic of a system for enhancing the recovery of essential oil.

Referring now to FIG. 1, a system 10 for enhancing essential oil recovery is shown. The system 10 is configured to extract essential oil from a starting essential oil-containing food material 12 and may be included as part of a larger system that processes the starting material 12. As described in greater detail below, the system 10 uses a pulsed electric field apparatus 16 to obtain a greater yield of essential oil from the starting food material 12.

As previously noted, the starting food material 12 may be any plant, algae, and/or animal matter that contains essential oil. In some aspects, the material is a plant that may be edible such as an edible fruit or vegetable. In certain aspects, the fruit may include, but is not limited to, fruits in the Rutaceae family, also commonly known as the citrus family, and may be exemplified by orange, lemon, grapefruit, pomelo, lime, mandarin, clementine, and which may be referred to in this application as citrus fruits. In some embodiments, the essential oil is obtained from the peel or flavedo of citrus fruits. It is to be understood that the described system and process applies to the enhanced recovery of essential oil from any material; however, for ease of description, the system and process will be described in connection with a citrus fruit.

The system 10 includes a pulsed electric field (PEF) apparatus 16 having an inlet 14 and an outlet 18. The PEF apparatus 16 may include a single treatment chamber 70 (best seen in FIG. 2A) or multiple treatment chambers placed in series or in parallel. For example, where a PEF apparatus operates continuously or semi-continuously (for example, using collinear treatment chambers) treatment uniformity may be enhanced by providing a number of serial treatment flow cells. By providing a number of serial treatment zones, the required processing time may be broken up into small fractions that may allow intermediate cooling of the material.

Typically, a PEF apparatus includes a high-voltage power source, an energy storage capacitor bank, a charging current limiting resistor, a switch to discharge energy from the capacitor across the food material and a treatment chamber. The PEF apparatus is configured to deliver short pulses of high electric fields over a short period of time, e.g., in the order of about 0.1 to about 10 kV/cm, or about 0.5 to about 5 kV/cm, or about 1 to about 3 kV/cm, or about 1.5 to about 2.5 kV/cm for microseconds to milliseconds. The electric field may be applied in the form of exponentially decaying, square wave, bipolar, oscillatory pulses at ambient, sub-ambient, or slightly above-ambient temperature. The specific energy of the treatment ranges from about 10 kJ/kg to about 60 kJ/kg, or about 15 kJ/kg to about 35 kJ/kg, or about 20 kJ/kg to about 30 kJ/kg and in some instances about 25 kJ/kg. A pulse frequency between about 0.5 to about 20 Hz, or about 1 Hz to about 10 Hz is suitable, and in some instances about 10 Hz.

The treatment chamber may be arranged to receive the food material in solid phase, with a liquid transport carrier, and to direct the food material past at least two electrodes, where the pulse generator is arranged to apply a PEF to a treatment space between the electrodes. In one embodiment, the process is continuous and the food material is conveyed on a conveyor belt system to and through the PEF apparatus, where the treatment space receiving the PEF is across a portion of a conveyor belt submerged in the liquid transport carrier. Suitable PEF apparatuses are available, for example, from Pulsemaster (Seattle, Wash.).

Figure 2A:
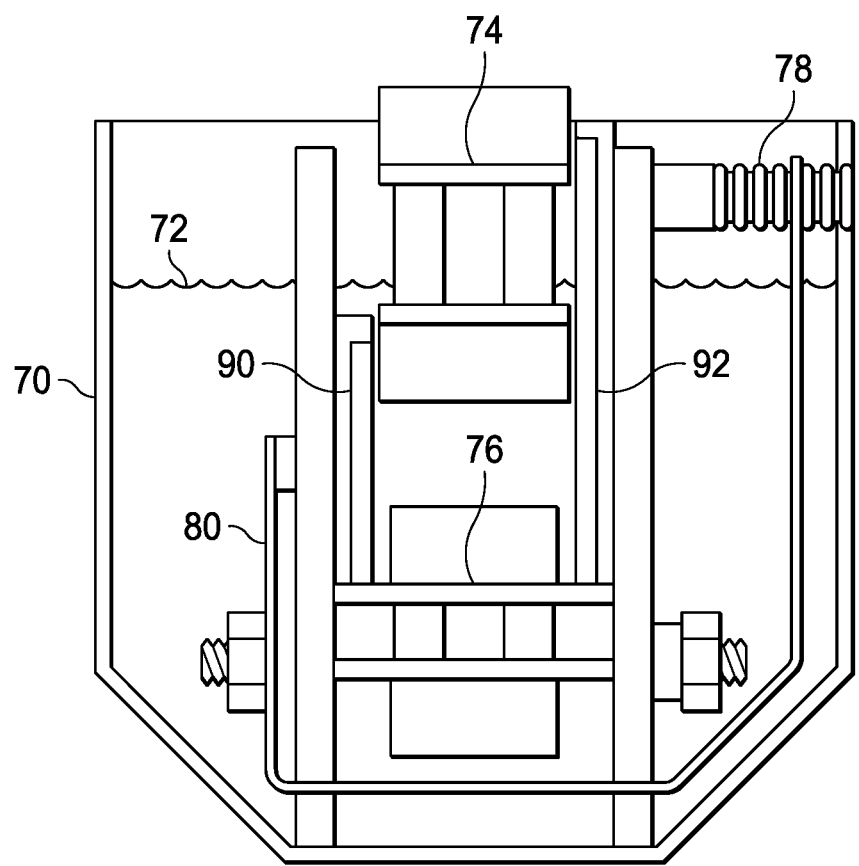
FIG. 2A depicts an internal view of one embodiment of a pulsed electric field treatment chamber.
Figure 2B:
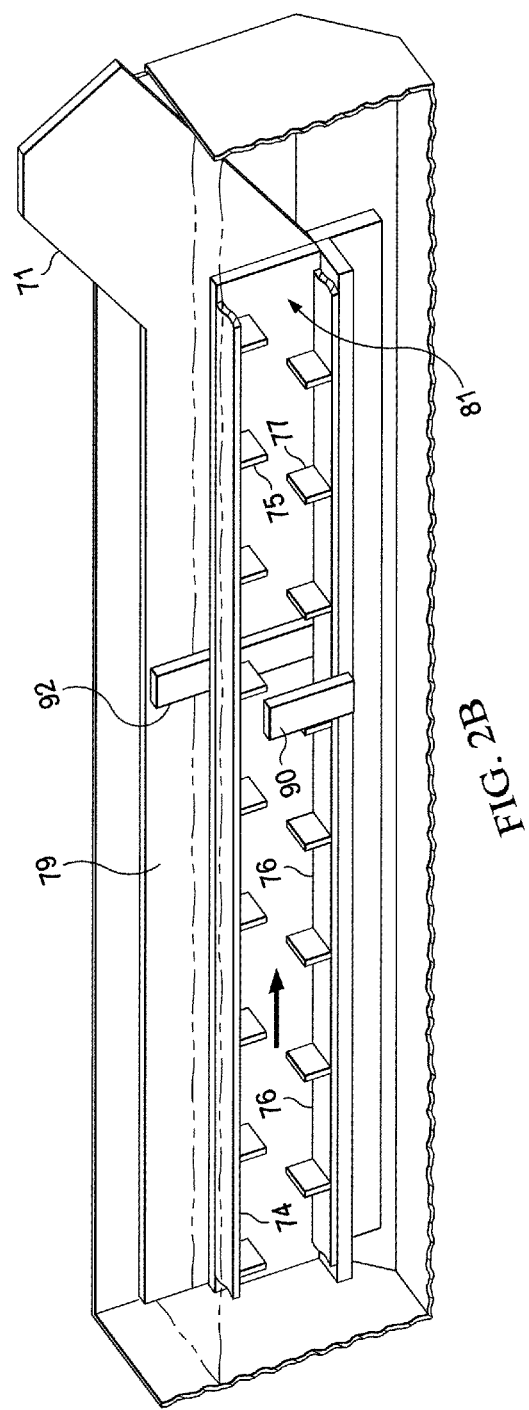
FIG. 2B depicts a cutaway view of the pulsed electric field treatment chamber of FIG. 2A.

Turning to FIGS. 2A and 2B, one embodiment of the PEF treatment chamber 70 through which the food material is treated according to the above described method of FIG. 1 is shown. The chamber 70 is comprised of a tub with sidewalls 71 comprising sidewall insulators 79 around an inner chamber that comprises a predetermined liquid transport carrier (also referred to as a water solution) level 72, an upper conveyor belt 74 above the predetermined water solution level 72, a lower conveyor belt 76 below the predetermined solution water level 72, and a vertically oriented electrode configuration 90, 92 on opposing sides of a top surface of the lower conveyor belt 76.

The tub may be formed from any suitable material but is typically metal and generally stainless steel. The walls 71 support the belting and the drives while the inner chamber around the electrodes typically include polymer insulators of ultrahigh molecular weight. The vertically oriented electrode configuration has a positive electrode 92 and a negative electrode 90, with the negative electrode 90 fully submerged beneath the predetermined water solution level 72. The predetermined amount is a sufficient amount such that at least the bottom of the upper conveyor belt 74 is submerged within the water solution. The chamber unit 70 is configured to provide or apply a pulsed electric field to a treatment space between the negative electrode 90 and the positive electrode 92, and between a bottom surface of the upper conveyor belt 74 and a top surface of the lower conveyor belt 76.

The food material is fed into the chamber 70 below the upper conveyor belt 74, above the lower conveyor belt 76. Flights 75 on the upper conveyor belt 74 are configured to ensure that the food material remains below the predetermined water solution level 72 when the food material is moved by the upper conveyor belt 74 along the produce flow direction indicated by the arrow in FIG. 2B. Similarly, flights 77 on the lower conveyor belt 76 help ensure the produce flow continues to move in the produce flow direction.

In one embodiment, the conveyor belts 74, 76 are formed from a plastic material such as an ultrahigh molecular weight plastic. In one embodiment, an electrode strap 80 is connected to the negative electrode and passes under the lower conveyor belt 76 to an electrical terminal 78 that is insulated from the sidewall of the tank. The terminal 78 may also connect to the positive electrode 92 such that current flows through the positive electrode 92 and down the equipment across the liquid or water level.

During operation, the chamber 70 may be closed to minimize electrical field interference and to comply with safety mechanisms of the PEF chamber. In one embodiment, the positive electrode 92 is only partially submerged below the predetermined water solution level, while the negative electrode 90 is fully submerged. That is, the positive electrode 92 is longer than the negative electrode 90 and the lower ends of the electrodes 90, 92 are aligned at substantially the same depth in the water. The positive electrode is longer than the negative electrode in one embodiment and electrically connected above the predetermined water level 72. In such an embodiment, the positive electrode extends above the predetermined water solution level, or out of the water solution.

Air within the chamber 70 may also act as an insulator for the positive electrode 92. It is believed that the vertically oriented electrode configuration may provide an uninterrupted treatment space within the chamber 70 and may provide a more localized field. In one embodiment, the positive electrode is substantially parallel to the negative electrode. As used in this description, the term "substantially" refers to the complete or nearly complete extent or degree of an action, characteristic, property, state, structure, item, or result. For example, the "substantially" parallel electrodes are either completely parallel or nearly completely parallel.

After the food material is subjected to the pulsed electric field it passes through the outlet 18 to the extractor 22. A portion of the liquid transport carrier (water solution), which may contain some essential oil, may accompany the food material. However, substantially all of the liquid transport carrier (water solution) is recycled (not shown) to a location upstream of the electrodes.

It is believed that electroporation caused by the PEF enhances the extraction of the essential oil from the food material. In particular, it is believed that electroporation effectively disrupts membranes and/or cells in the flavedo, which promotes the extraction of essential oil from the flavedo. Accordingly, during the PEF treatment, some essential oil may be expressed into the liquid transport carrier. Accordingly, it is contemplated that the essential oil-containing liquid transport carrier 15 can be directed upstream of the first separator 38 where it may be combined with the clarified first fluid mixture 35 (described below). The essential oil-containing liquid transport carrier 15 may be removed in a batch-wise manner or in a continuous manner. In either instance, it is sought to recover the essential oil that is expressed into the liquid transport carrier as a result of the electroporation caused by the PEF.

Turning back to FIG. 1, downstream of the PEF apparatus 16 an essential oil extractor 22 is shown. The essential oil extractor 22 is configured to process the PEF-treated material 12. The extractor 22 has an inlet 20, an outlet 26 from which the remaining starting material may be directed for further processing, and an outlet 24 containing a first fluid mixture 25. The material 12 is delivered by a conveyor (not shown) or any suitable delivery device from the outlet 18 of the PEF apparatus 16 to the inlet 20 of the essential oil extractor 22.

Generally, the extractor 22 is configured to extract the essential oil in the presence of water to provide a first fluid mixture 25 containing a dilute essential oil-water emulsion. The extractor 22 can be any suitable apparatus that is configured to extract essential oil from the starting essential oil-containing material 12. Typically, the first fluid mixture 25 contains from about 0.1% to about 5% of essential oil, or from about 0.5% to about 3.5%, or about 0.5% to about 1.5%, or about 1% essential oil.

In one embodiment, the extractor can be in the form of a horizontal bed having a number of serrated rollers that typically have a different rotational speed and that can oscillate axially. Alternatively, the rollers may be in the form of serrated discs packed on a shaft. Yet alternatively, the outer surface of the rollers may be provided with sharp points. It is contemplated that the rollers may have any suitable outer surface so long as it is configured to scarify the peel or flavedo (outer surface) of the food material 12. Generally, the essential oil is extracted by scarifying substantially the entire surface of the food material 12 beneath a shallow pool of water to reduce the loss of oil to the atmosphere and to provide the first fluid mixture 25.

In another embodiment, an apparatus is provided that is configured to simultaneously extract the juice from the fruit and extract the essential oil. An example of such apparatuses are JBT® Model 491B and Model 593. In this type of apparatus, fruit is placed on a lower extractor cup and lower cutter after which an upper cup descends, pressing the fruit against the lower cup and plugs are cut in the fruit. As the upper cup descends, juice and inner fruit contents are forced down through the lower cutter for juice recover. At the same time, the peel is shredded and forced through openings in the upper cup which ruptures the oil glands. The upper cup assembly contains a spray ring that applies pressurized water to the peel during and after the shredding step to emulsify the essential oil as it is released to form the first fluid mixture 25.

As noted above, the extractor 22 includes an outlet 26 through which the PEF-treated starting material 12 having a depleted essential oil concentration is conveyed for further processing. The extractor 22 also includes an outlet 24 through which the first fluid mixture 25 exits the extractor 20. It should be appreciated that the phrase "fluid mixture" refers to mixtures that include fluids or liquids and mixtures that include both fluids and solids or partially solid materials.

Downstream of the extractor 22, a tank (not shown) may be provided to collect the first fluid mixture 25. Alternatively, and as shown in FIG. 1, an optional solids separator 30 is provided to receive the first fluid mixture 25 from the extractor 22. The solids separator 30, when provided, is used to separate the frit or other solid material from the first fluid mixture 25. The solids separator 30 may be a screw finisher, paddle finisher, vibrating screen, gravity flow screen, or other suitable apparatus that is effective and gentle to separate the solids from the first fluid mixture 25 without extracting naturally occurring pectin and/or hesperidin from the frit or other solid material. The solids separator 30 has an outlet 32 from which clarified first fluid mixture 35 exits and an outlet 34 from which the frit and other solid material exits.

The first fluid mixture 25 or the clarified first fluid mixture 35 is directed to an inlet 36 of a separator 38 configured to separate water and solids to form an essential oil-rich fraction, which may be in the form of an emulsion. The separator 38 separates the first fluid mixture 25 or the clarified first fluid mixture 35 into three parts, a waste fluid mixture, a recycle fluid, and a second fluid mixture 45. Accordingly, the separator 38 includes an inlet 36, a first outlet 40, a second outlet 42, and a third outlet 44.

The separator 38 may be any suitable separation equipment that is configured and effective to separate the essential oil from the first fluid mixture 25 or the clarified first fluid mixture 35 from the water and remaining solids. The separated starting material (waste fluid mixture) is directed through outlet 42 for further processing.

The recycle fluid, which contains less than about 0.5% essential oil or, less than about 0.1% essential oil, is directed through outlet 44 and will be recycled to the extractor 22. The second fluid mixture 45 is directed through the outlet 40 for storage (not shown) or further processing.

The inlet 36 is fluidly connected to (or in fluid communication with) the outlet 24 of the extractor 22 via one or more pipes (and, as explained above optionally through a solids separator 30). It should be appreciated that one or more pumps (not shown) may be connected to the pipes to move the fluid mixture from the extractor 24 to the separator 38. It should also be appreciated that, in other embodiments, the inlet 36 of the separator 38 may be connected to a tank or other storage container (not shown) that stores the first fluid mixture 25 until the separator 38 is ready to receive it.

Figure 3:
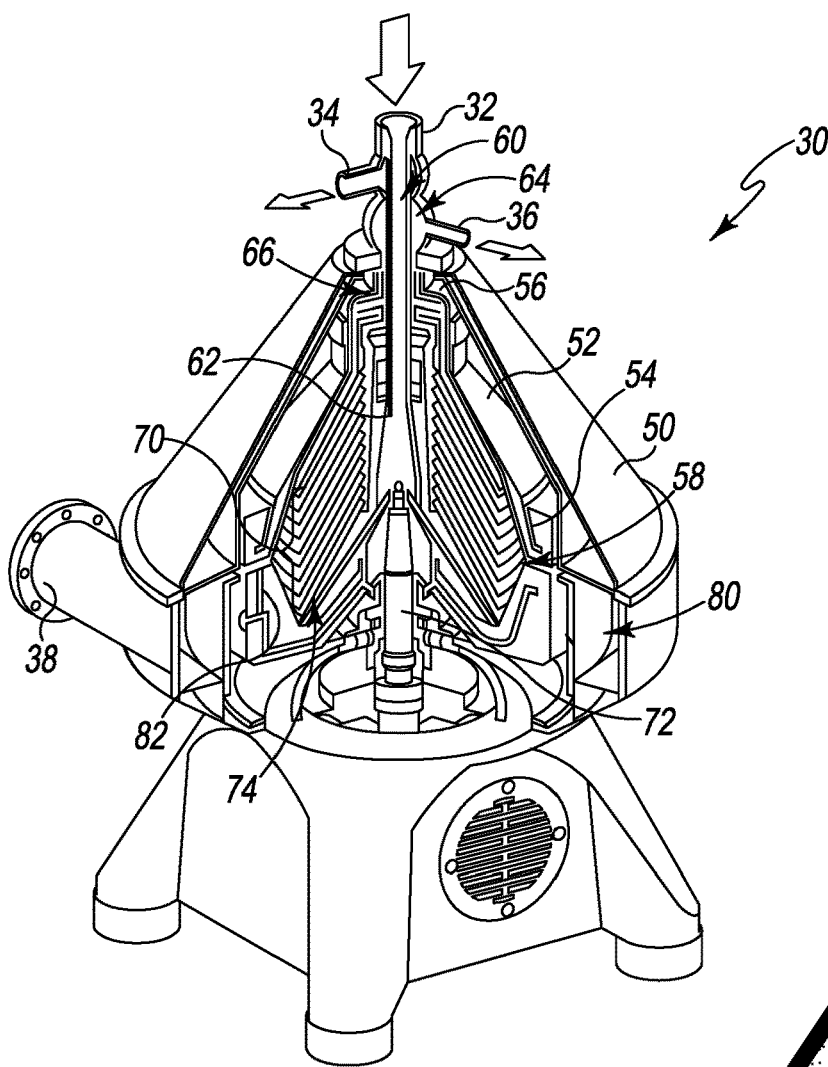
FIG. 3 is a perspective view of a partial cross-sectional view of an exemplary separator useful in one embodiment of the system shown in FIG. 1.

Referring now to FIG. 3, in one embodiment, the separator 38 is illustrated as a centrifuge that includes an outer housing 150 and an inner shell 152. One of skill in the art will appreciate the centrifuge may be configured in any suitable manner so that it is effective to efficiently separate the materials. For simplicity however, an exemplary centrifuge will be described. The inner shell 152 is tapered, extends from a lower base 154 to a narrow upper tip 156, and defines a chamber 158 configured to receive the first fluid mixture 25. The separator 38 includes a feed tube 160 that is connected to the inlet 36 and extends to a lower end 162 positioned within the chamber 158. The feed tube 160 extends co-axially with a discharge tube 164 that extends between the chamber 158 and the outlet 44. Another discharge tube 166 extends co-axially with the tubes 160, 164 between the chamber 158 and the outlet 42.

Figure 4:
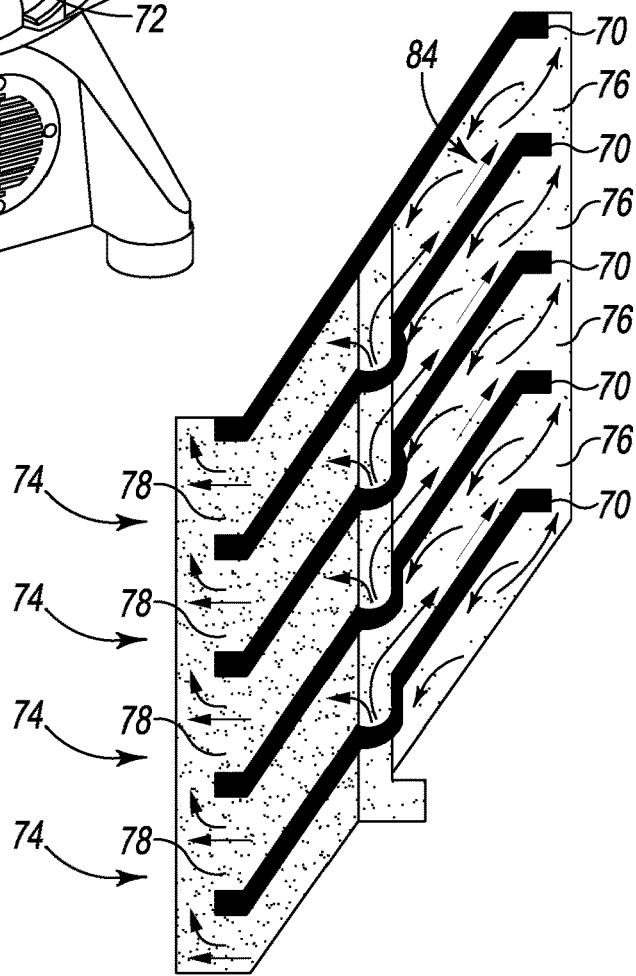
FIG. 4 is an elevation view of a portion of the separator shown in FIG. 3.

The separator 38 includes a plurality of plates 170 positioned in the chamber 158 and configured to rotate within the shell 152. In the illustrative embodiment, the plates 170 are coupled to a drive shaft 172 extending upwardly from a motor (not shown) positioned below the inner shell 152. Each plate 70 is conical in shape, and, as shown in FIG. 4, a plurality of channels 174 are defined between the plates 170. Each channel 174 extends from an open upper end 176 positioned adjacent the lower end of the discharge tube 164 to an open lower end 178.

The separator 38 also includes an annular outer passageway 180 that extends around the outer wall 182 of the shell base 154. As shown in FIG. 3, the passageway 180 is connected to the outlet 42 of the centrifuge. A plurality of doors (not shown) are positioned in the outer wall 182 to selectively connect the passageway 180 to the chamber 158 to permit the removal/discharge of solid waste materials from the chamber 158.

In use, the first fluid mixture 25, which contains essential oil, a dilute essential oil-water emulsion, water, and starting material is fed through the inlet 36, along the feed tube 160, and into the chamber 158 of the separator 38. The plates 170 are rotated by the drive shaft to separate the first fluid mixture into lighter and heavier components. The lightest phase of the first fluid mixture remains near the upper ends 176 of the channels 174, within a region 184 near the axis of rotation of the separator 38. This lightest phase is referred to as the second fluid mixture 45 and it includes essential oil, an essential oil-water emulsion, water and a small amount of solid particles. The second fluid mixture 45 is directed out of the separator 38 through the outlet 40. Typically, the concentration of the essential oil present in this second fluid mixture is from about 40% to about 95%, or about 60% to about 90%, or about 70% to about 87%, or about 75% to about 85%.

The heaviest phase of the first fluid mixture, which may include starting material waste, solids, and water is drawn by centrifugal force to the outer wall 182 of the shell 152 adjacent to the annular outer passageway 180. The separator 38 periodically opens the doors to connect the passageway 180 to the chamber 158 to flush these materials out of the separator 38 through the outlet 42 for further processing. It should be appreciated that this heaviest phase of the first fluid mixture (or clarified first fluid mixture) exiting outlet 42 may include some amount of essential oil, which may be directed for further processing.

The third phase of the fluid mixture, which primarily includes water and may include fine solids, moves toward the lower ends 178 of the channels 174. This phase is advanced out of the separator 38 through the outlet 44 and returned to the extractor 22 as recycled fluid that is used in the extractor 22. It should be appreciated that the middle phase of the fluid mixture (the recycled fluid) may include some amount of essential oil, which is also recycled to the extractor 22.

Returning to FIG. 1, the system 10 may include a second separator 50 (sometimes referred to as a polisher). It should be appreciated that one or more pumps (not shown) may be connected to the pipes to move the fluid mixture from the first separator 38 to the second separator 50. It should also be appreciated that in other embodiments the inlet 48 of the second separator 50 may be connected to a tank or other storage container (not shown), which stores the second fluid mixture 45 from the separator 38 until the second separator 50 is ready to receive it.

In addition, while not shown, it is contemplated that a heater may be provided to raise the temperature of the second fluid mixture 45 to an extent to disrupt the essential oil-water emulsion and to drive the essential oil from the essential oil-water emulsion to enhance recovery of the essential oil. In this instance, the temperature of the second fluid mixture 45 may be in the range of about 30° to about 90° or from about 35° C. to about 70° C., or from about 35° C. to about 50° C., or from about 35° C. to about 45° C., or about 40° C. It is further contemplated that a heater may be provided before some, each, or all separators provided in the process.

The second separator 50 may be any suitable separation equipment that is effective to separate the essential oil from the second fluid mixture 45 to form a third fluid mixture 55 that contains a higher concentration of essential oil than in the second fluid mixture 45. In one embodiment, the second separator 50 is a centrifugal separator, i.e., a centrifuge similar to that shown in FIGS. 3 and 4 and described above.

The second separator 50 includes an inlet 48 that is fluidly connected to the outlet 40 of the second separator 38 via one or more pipes. It should be appreciated that one or more pumps (not shown) may be connected to the pipes to move the second fluid mixture 45 from the first separator 38 to the second separator 50. The second separator 50 includes a first outlet 52 which may be in fluid communication with a cooler (not shown) and second outlet 54 which directs a waste stream for further processing.

As noted above, in one illustrative embodiment, the second separator 50 has a configuration similar to the separator 38 described above. In use, the second fluid mixture 45 is advanced through the inlet 48, along the feed tube 160, and enters the chamber 158 of the second separator 50. The second fluid mixture 45 is then separated into lighter and heavier components by the rotation of the plates 170. The lighter phase of the second fluid mixture remains near the upper ends 176 of the channels 174, within a region 184 near the center of the chamber 158. This part of the second fluid mixture 45 includes a substantial portion of essential oil with minor amounts of an essential oil-water emulsion and water, and is referred to as the third fluid mixture. The third fluid mixture 55 is advanced out of the second separator 50 through the outlet 52.

In some embodiments, the third fluid mixture 55 is directed to a tank (not shown) to be stored for further processing. In other embodiments, the third fluid mixture is directed to a third separator (not shown) located downstream of the second separator 50.

The concentration of essential oil in the third fluid mixture 55 is greater than the concentration of essential oil in the second fluid mixture 45. Typically, the concentration of essential oil in the third fluid mixture 55 is greater than about 80% and may be in the range of about 80% to about 97% and may be about 91% to about 97%, or about 95%. This essential oil may be considered a finished product and may be packaged for commercial use.

The heavier phase of the second fluid mixture, which may include fine solids and water, moves toward the lower ends 178 of the channels 174. This phase is advanced out of the second separator 50 through the outlet 54 for further processing. This phase may include some small amount of essential oil, which may be recovered in further processing.

In some embodiments, a cooler may be provided downstream of the first separator 38, the second separator 50, the third separator (not shown), or some combination of them to reduce the temperature of the first fluid mixture 25, the second fluid mixture 45, the third fluid mixture 55 or any combination of them. It should also be appreciated that in some embodiments the inlet of the cooler may be connected to a tank or other storage container (not shown), which stores the fluid mixtures (the first, second, third, or some combination of them) from their respective separators until the cooler is ready to receive it.

In one embodiment, the cooler is a shell and tube exchanger that uses cold fluid (e.g., water) to cool the fluid mixture(s). Typically, the cooler 110 is operable to cool the mixture(s) to a temperature of about 50° C. or less such as about 40° C. or about 30° C. or about 25° C.

It is also contemplated that in some embodiments the mixture(s) may be "winterized" (de-waxed). In other words, the mixture(s) (any of the first, second, third mixtures or combinations of them) may be stored in a tank or tanks such as cone-bottom tanks and chilled to a temperature of about 0° C. Winterizing seeks to precipitate naturally occurring wax that may be present in the essential oil.

As mentioned above, it is contemplated that a third separator (not shown) may be provided. The third separator is optional and, if provided, is typically referred to as a polisher.

The third separator may be any suitable separation equipment that is effective to separate the essential oil from the third fluid mixture 45 to form a fourth fluid mixture that contains a higher concentration of essential oil than in the third fluid mixture. In one embodiment, the third separator is a centrifugal separator, i.e., a centrifuge.

The concentration of essential oil in the fourth fluid mixture is greater than the concentration of essential oil in the third fluid mixture 55. Typically, the concentration of essential oil in the fourth fluid mixture is about 91% to about 97%, and may be about 95%, although in some instances the concentration of essential oil may be about 97% to about 99%, or greater.

According to another aspect, a method or process for enhancing the recovery of essential oil is disclosed. One of skill will appreciate that the system 10 described above can be used to implement the described process for enhancing the recovery of essential oil. Further, one of skill will understand that the concentrations of essential oil and temperatures of the various fluid mixtures described above will apply equally to the described process even though they may not be expressly stated.

The process includes expressing (i.e. obtaining or extracting) essential oil from a material into water to define a first fluid mixture. The first fluid mixture includes the essential oil, an essential oil-water emulsion, and water, and may include solids, proteins, and other constituents of the material source. The oil may be extracted from the material in any suitable manner to effectively obtain the essential oil from the material. Typically, the first fluid mixture contains from about 0.1% to about 5% of essential oil, or from about 0.5% to about 3.5%, or about 0.5% to about 1.5%, or about 1% essential oil.

The process also includes exposing or subjecting food material to a pulsed electric field and thereafter, expressing the essential oil from the PEF treated food material to form a first fluid mixture 25. Next, the first fluid mixture 25 is separated to produce a second fluid mixture 45 that includes essential oil, an essential oil-water emulsion, water and a small amount of solid particles. The separating may be achieved by a separator 38 that effectively separates the essential oil from other constituents of the first fluid mixture.

In one embodiment, the separating may be accomplished using a centrifuge. The first fluid mixture 25 contains a first concentration of essential oil, and the second fluid mixture 45 includes a second concentration of essential oil that is greater than the first concentration of essential oil. Typically, the concentration of the essential oil present in this second fluid mixture 45 is from about 40% to about 95%, or about 60% to about 90%, or about 70% to about 87%, or about 75% to about 85%.

In one embodiment, the first fluid mixture 25 is subjected to solids separation to separate the frit or other solid material from the first fluid mixture 25 and to provide a clarified first fluid mixture 35. The solids separator 30 may be a screw finisher, paddle finisher, vibrating screen, gravity flow screen, or other suitable apparatus that is effective and gentle to separate the solids from the first fluid mixture 25 without extracting naturally occurring pectin, hesperidin, and/or limonin from the frit or other solid material.

Either the second fluid mixture 45 is subjected to a second separation to further separate the essential oil from the other constituents of the second fluid mixture 45 to provide a third fluid mixture 55. In one embodiment, the separating may be accomplished using a centrifuge. The third fluid mixture 55 includes a third concentration of essential oil that is greater than the second concentration of essential oil. Typically, the concentration of essential oil in the third fluid mixture is greater than about 80% and may be in the range of about 80% to about 97%, or may be about 91% to about 97% and may be about 95%.

In some embodiments, the process includes reducing the temperature of the third fluid mixture 55. Thereafter, the cooled third fluid mixture may be further separated to produce a fourth fluid mixture that contains a fourth concentration of essential oil that is greater than the concentration of essential oil in the third fluid mixture.

The separating may be achieved by a separator that effectively separates the essential oil from other constituents of the third fluid mixture 55 to form a fourth fluid mixture. In one embodiment, the separating may be accomplished using a centrifuge. Typically, the concentration of essential oil in the fourth fluid mixture is about 91% to about 97%, %, and may be about 95%, although in some instances the concentration of essential oil may be about 97% to about 99%, or greater, which may be considered substantially pure essential oil.

In accordance with the above description of the system and process, the following examples are presented to illustrate an exemplary application of the described system and process and are not meant to limit the claimed invention.

Example 1

A control orange was placed in a container of water and tumbled in the water for 10 seconds. Thereafter, the amount of essential oil present in the water was measured and the concentration of essential oil was found to be 0.012%.

To test the efficacy of PEF, an orange was placed in a container with water and subjected to a PEF for 145 seconds at 10 kV, 10 Hz, at 2000 pulses with the orange being rotated about every 500 pulses. After the PEF treatment, the orange was tumbled in the water for 10 seconds. Thereafter, the amount of essential oil present in the water was measured and the concentration of essential oil was found to be 0.018%, which is about a 48% increase over the control.

Example 2

An experiment was conducted to determine the effect of the PEF field on the extraction of oil. Oranges were marked to indicate a relative surface on each orange. Three surfaces of each orange were scanned using a near-infrared scanner to estimate an oil concentration. The surfaces were parallel to the PEF probe, orthogonal to the PEF probe, and a surface not subjected to the PEF probe. Thereafter, the oranges were subjected to PEF and then subjected to three subsequent impacts to mimic the squeezing force imparted by a Brown Oil Extractor. After each impact, the surface of the orange was wiped with a cloth to remove exposed liquid and then the three surfaces were scanned using the NIR. The results are shown in Table 1, below.

TABLE 1

| | Units | Untreated | | PEF Measurement Surface | | | PEF Orthogonal to Measurement Surface | |
|---|---|---|---|---|---|---|---|---|
| Sample Number | N/A | 44 | 43 | 40 | 37 | 39 | 42 | 38 |
| Initial Oil Concentration Prior to PEF Treatment | lbs of oil/ton of orange | 12.46 | 14.66 | 20.7 | 16.29 | 12.87 | 15.82 | 13.29 |
| Oil Concentration After First Impact | lbs of oil/ton of orange | 13.1 | 13.19 | 17.47 | 14.67 | 11.08 | 13.58 | 13.09 |
| Oil Concentration After Second Impact | lbs of oil/ton of orange | 13.15 | 12.85 | 17.08 | 13.37 | 11.03 | 14.91 | 13.46 |
| Oil Concentration After Third Impact | lbs of oil/ton of orange | 12.9 | 13.22 | 17.55 | 16.83 | 11.43 | 13.21 | 13.65 |
| Average Extraction Efficiency for each Condition | % | 3 | | 12.14 | | | 5.65 | |

It was observed that there was a statistical difference between the untreated oranges and the oranges exposed to PEF parallel to the surface measured by the NIR.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. A process for recovering essential oil from a fruit comprising the following sequential steps:
   exposing the fruit to a pulsed electric field (PEF) to provide a treated fruit;
   extracting an essential oil from the treated fruit in the presence of water to form a first fluid mixture containing a dilute emulsion of the essential oil, the first fluid mixture including a first concentration of essential oil;
   separating the first fluid mixture to produce a second fluid mixture that includes the essential oil and waste components, the second fluid mixture having a second concentration of essential oil that is greater than the first concentration of essential oil; and
   separating the second fluid mixture to produce a third fluid mixture that includes a third concentration of essential oil greater than the second concentration of essential oil.

2. The process of claim 1, wherein the second concentration of essential oil is from about 40% by weight to about 95% by weight essential oil.

3. The process of claim 1 further comprising cooling the third fluid mixture to a temperature less than about 50° C.

4. The process of claim 3, wherein the third concentration of essential oil is equal to or greater than about 80% by weight essential oil.

5. The process of claim 4 further comprising separating the cooled third fluid mixture to produce a fourth fluid mixture that includes a fourth concentration of essential oil greater than the third concentration of essential oil.

6. The process of claim 5 wherein the fourth concentration of essential oil is equal to or greater than about 91% by weight essential oil.

7. The process of claim 1 further comprising removing solids prior to separating the first fluid mixture.

8. The process of claim 1 wherein the fruit is at least partially submerged in a liquid transport carrier while being exposed to the PEF.

9. The process of claim 8 wherein, after the fruit is exposed to the PEF, a second dilute essential oil emulsion is formed.

10. The process of claim 9 further comprising combining the second dilute essential oil emulsion with the first fluid mixture prior to separating.

11. A process for recovering essential oil from a fruit comprising the following sequential steps:
    exposing the fruit to a pulsed electric field (PEF) to provide a treated fruit and to form a first dilute essential oil emulsion;
    extracting an essential oil from the treated fruit in the presence of water to form a first fluid mixture containing a second dilute emulsion of the essential oil, the first fluid mixture including a first concentration of essential oil; and, separating the first fluid mixture to produce a second fluid mixture that includes the essential oil and waste components, the second fluid mixture having a second concentration of essential oil that is greater than the first concentration of essential oil.

12. The process of claim 11 further comprising combining the first dilute essential oil emulsion with the first fluid mixture prior to separating.

* * * * *